United States Patent [19]
Satou et al.

[11] Patent Number: 6,076,841
[45] Date of Patent: Jun. 20, 2000

[54] STRUCTURE FOR MOUNTING A COIL SPRING TO A VEHICLE BODY AND METHOD THEREFOR

[75] Inventors: Masaharu Satou; Yutaka Hozumi, both of Kanagawa-ken, Japan

[73] Assignee: Nissan Motor Co., Ltd., Kanagawa-ken, Japan

[21] Appl. No.: 09/009,546

[22] Filed: Jan. 20, 1998

[30] Foreign Application Priority Data

Jan. 20, 1997 [JP] Japan ........................... 9-007999

[51] Int. Cl.[7] .................................................. B60G 11/16
[52] U.S. Cl. ........................ 280/124.179; 280/124.135; 267/286
[58] Field of Search ................... 280/124.155, 124.147, 280/124.151, 124.144, 124.162, 124.164, 124.165, 124.177, 124.179, 124.135; 267/286, 289, 292; 411/508

[56] References Cited

U.S. PATENT DOCUMENTS

| | | |
|---|---|---|
| 4,087,117 | 5/1978 | Brace et al. . |
| 4,400,008 | 8/1983 | Rumpel . |
| 4,480,852 | 11/1984 | Rumpel . |
| 4,531,759 | 7/1985 | Rezanka et al. ................. 280/124.155 |
| 4,531,761 | 7/1985 | Sivers ............................... 280/124.147 |
| 4,989,894 | 2/1991 | Winsor et al. . |
| 5,275,389 | 1/1994 | Pinch et al. ...................... 280/124.147 |
| 5,330,166 | 7/1994 | Aoki ........................................ 267/220 |
| 5,658,006 | 8/1997 | Freeman et al. ........................ 267/286 |
| 5,746,559 | 5/1998 | Shirai ..................................... 411/182 |

*Primary Examiner*—Peter C. English
*Assistant Examiner*—Lynda Jasmin
*Attorney, Agent, or Firm*—McDermott, Will & Emery

[57] ABSTRACT

In order to simplify mounting a coil spring to a vehicle body, a connecting device, which connects a spring bracket to the vehicle body, is disposed at an inner circumferential portion of the coil spring. This eliminates the problem that the spring bracket needs a space for connecting to the vehicle body about an outer circumference of itself.

16 Claims, 6 Drawing Sheets

Inboard of the Vehicle

FIG. 1

Front of the Vehicle

STRUCTURE FOR MOUNTING A COIL SPRING TO A VEHICLE BODY AND METHOD THEREFOR

BACKGROUND OF THE INVENTION

1. Field of the Invention

The present invention relates to a structure for mounting a coil spring of a suspension system to a vehicle body and method of mounting the coil spring to the vehicle body. More particularly, the present invention relates to such a structure and method which are adapted to simplify and facilitate mounting the coil spring to the vehicle body.

2. Description of the Related Art

Coil springs such as those used as suspension springs, which have an essentially vertically oriented axis, are known to be mounted between a suspension component and a vehicle body in a manner wherein a lower end of the coil spring is supported on the suspension component such as a lower link, and wherein an upper end is attached to the body component via a spring seat.

SUMMARY OF THE INVENTION

It is an object of the present invention to provide a structure for mounting a coil spring which comprises a simple arrangement on the body component side which facilitates the fitting of the coil spring to the body component.

It is another object of the present invention to provide a method of mounting a coil spring which comprises a simple arrangement on the body component side and which facilitates the fitting of the coil spring to the body component.

In brief, the above objects are achieved by an arrangement wherein, in order to simplify and facilitate the mounting of a coil spring to the vehicle body via a spring bracket, the arrangement comprises a connecting device which connects the spring bracket to a vehicle body and which is disposed at an inner circumferential portion of the coil spring. Thus, the arrangement on the body component side is simplified, and fitting of the coil spring to the body component is made easy.

More specifically, a first aspect of the invention resides in a structure for mounting a coil spring of a suspension on a vehicle body comprising: a coil spring having a spring bracket at its upper end; said spring bracket being connected to the vehicle body by a connecting device; and said connecting device being disposed at an inner circumferential portion of the coil spring.

A second aspect of the invention resides in a method of mounting a coil spring of a suspension to a vehicle body comprising: disposing an upper end of said coil spring on a spring bracket; and connecting said spring bracket to the vehicle body via a connecting device which is disposed at an inner circumferential portion of the coil spring.

BRIEF DESCRIPTION OF THE DRAWINGS

The various other objects and features of this invention will become more clearly understood from the following description which is taken in conjunction with the appended drawings in which.

DETAILED DESCRIPTION OF THE INVENTION

Figure 1:
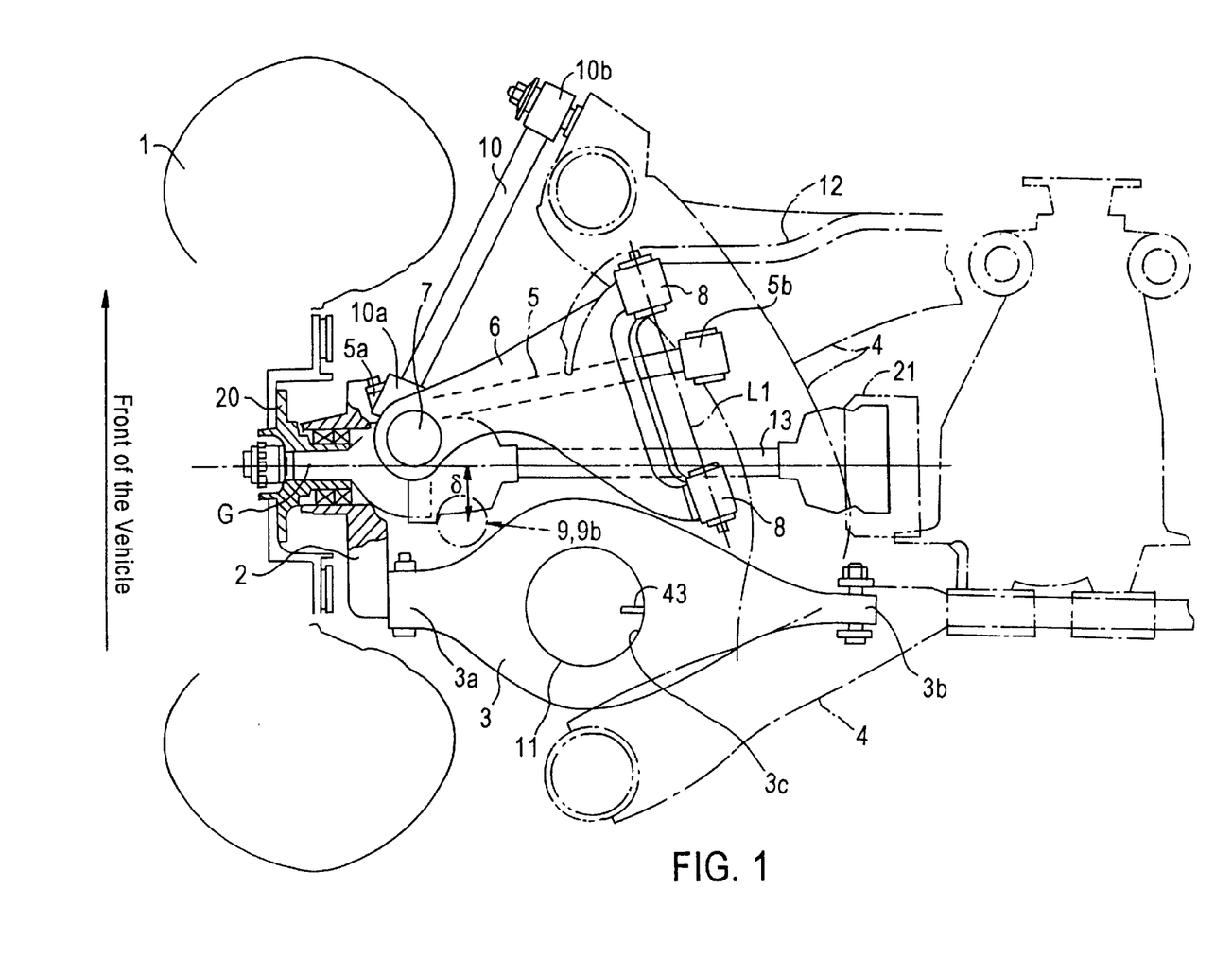
FIG. 1 is a plan view of a suspension including an embodiment of this invention.
Figure 2:
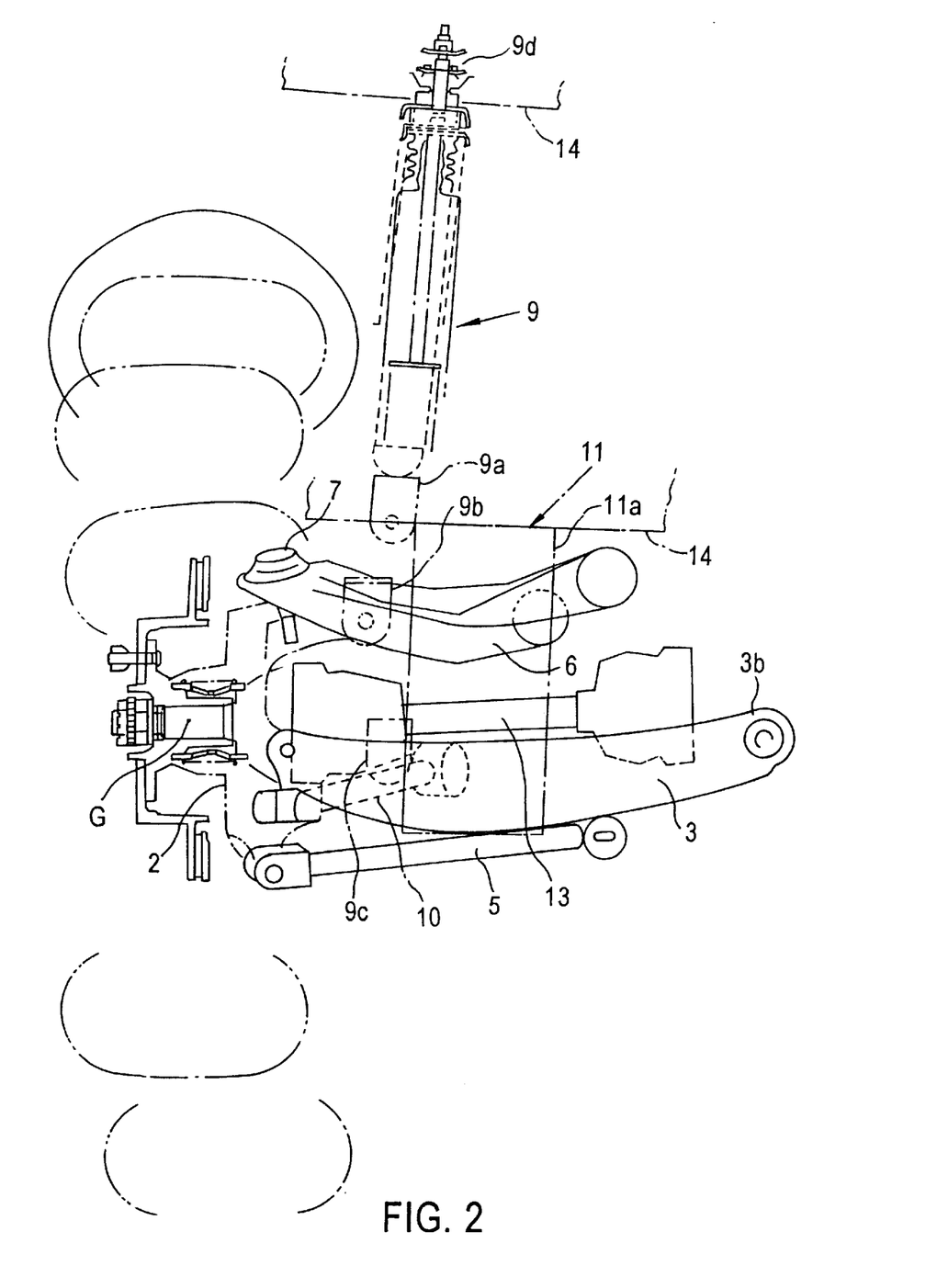
FIG. 2 is a rear view of the suspension including an embodiment of this invention.

Referring to the attached drawings, FIGS. 1 and 2 show a double wishbone type rear suspension system of a vehicle, which in this instance is, merely by way of example, provided on the left side of the vehicle.

An outboard end 3*a* of a side rod 3 is connected, so as to be pivotal in a vertical direction, to a lower and rear part of an axle 2 which rotatably supports a road wheel 1. The side rod 3 extends laterally with respect to the vehicle and is movably connected so as to be pivotal, in the vertical direction, with respect to a body member 4, such as a suspension member, at its inboard end 3*b*. An outboard end 5*a* of a lower link 5 is pivotally connected to a lower and front part of the axle 2. An inboard end 5*b* of the lower link 5, which extends approximately laterally with respect to the vehicle, is pivotally connected to the body member 4.

An outboard end of an upper link 6, which is formed by an A-shaped arm, is pivotally connected to an upper part of the axle 2 via a ball joint 7. Each of two connection points at the inboard ends of the upper link 6 is connected to the body component 4 via a bushing 8. An axis L1 about which the inboard end of the upper link 6 is pivotal, has an inclination to a center axis of a vehicle body. The suspension is set up to provide an anti-lift geometry through the inclined axis L1 since the upper link 6 pulls an upper part of the axle 2 forward with respect to the longitudinal axis (the front and rear direction) of the vehicle when the wheel 1 moves from a neutral position.

A first end 10*a* of a trailing arm 10 is movably connected in a vertical direction to a lower and front part of the axle 2. The trailing arm 10 extends slantwise with respect to the vehicle, and a second end 10*b* of the trailing arm 10 is movably connected to the body member 4. The trailing arm 10 affects the axle 2 by pulling it forward when the wheel bounds and rebounds from the neutral position.

Therefore, the suspension link structure of this embodiment is arranged such that the axle 2, in other words the wheel 1, moves only in the fore-and-aft direction of the vehicle in the case when the wheel 1 bounds or rebounds from neutral position, and the upper part of the axle 2 moves as if it were pulled forward in fore-and aft direction of the vehicle at least when the wheel 1 bounds.

The letter "G" denotes a center of gravity of the axle, and in this embodiment it is almost coincident with the center of wheel 1.

A lower end 9*a* of a shock absorber 9 is connected to the upper part of the axle 2. The shock absorber 9 is disposed in a manner wherein its axis is essentially vertical, and an upper part 9*d* thereof is connected to the body component 14 via a rubber mount. A reference character '9*b*' shows the position of a lower part of the shock absorber 9 which is connected to the axle 2 in normal position, '9*a*' shows the case of bound position, and '9*c*' shows the case of rebound position.

The reference numeral 12 denotes a stabilizer which is connected to the upper link 6 via a connecting rod (not shown). The reference numeral 13 denotes a drive shaft, which has an outboard connecting part pivotally connected to a hub 20 of the wheel 1 via a first constant velocity joint, and an inboard connecting part which is pivotally connected to a differential device 21 via a second constant velocity joint.

A recess 3c which is used for mounting a coil spring 11 is formed in a middle part of the side rod 3. A lower part of the coil spring 11, which is a suspension spring in this arrangement, is fixed to the side rod 3 so as to act as a suspension component, via the disposition a lower part thereof into the recess 3c.

A stopper 43, which prevents rotation, is formed in the recess 3c. This stopper 43 engages and locates the end of a lower part of the coil spring 11 in a determined position selected to so that an end of an upper part of the coil spring 11 located on the far side, in the fore-and-aft direction, at least, of the inclined surface.

The coil spring 11 extends in a manner wherein its axis is essentially vertical, and so that an upper end thereof is connected to the body component 14 via a spring bracket 30.

Figure 3:
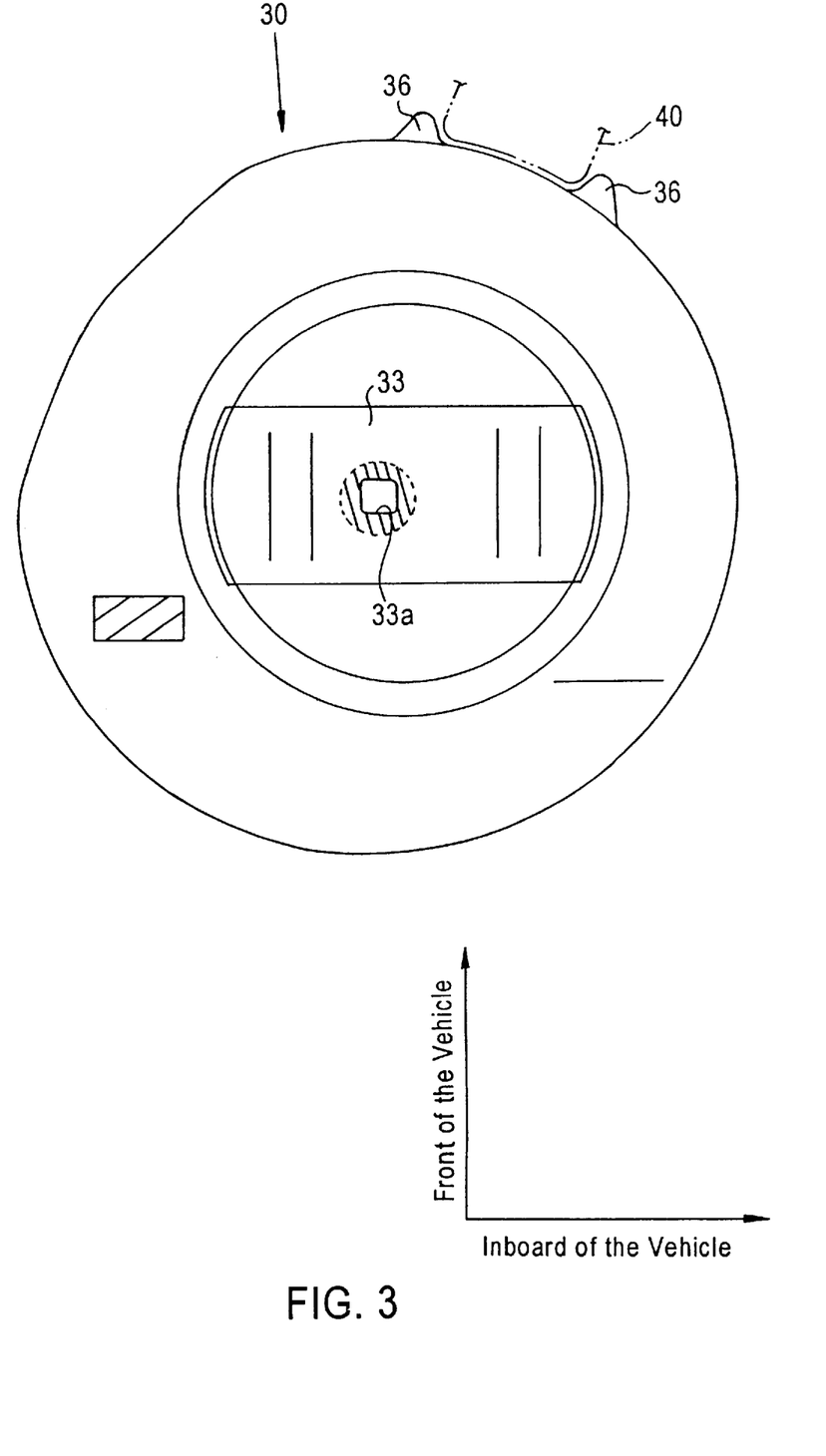
FIG. 3 is a plan view of a spring bracket included in an embodiment of this invention.
Figure 4:
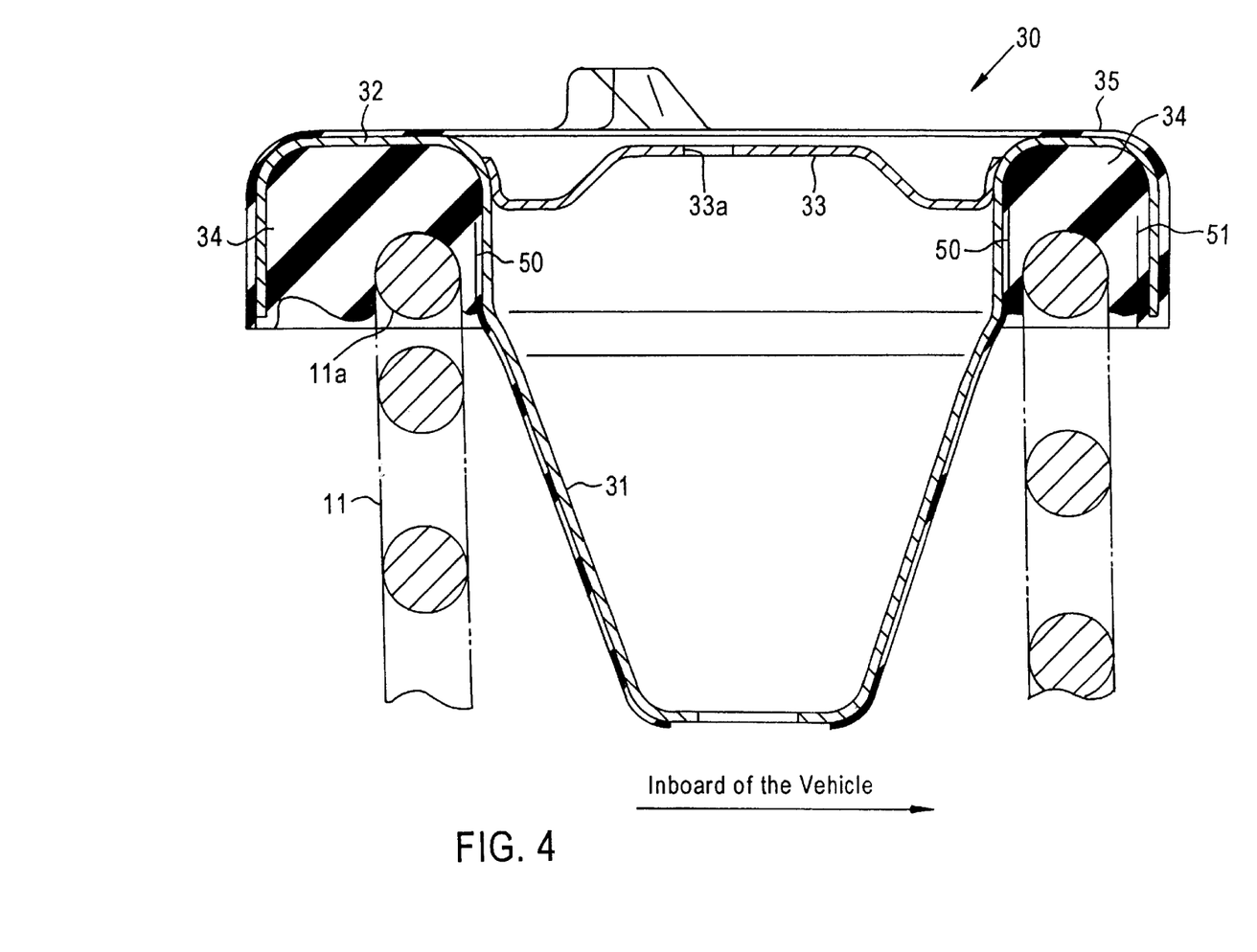
FIG. 4 is a rear sectional view of a spring bracket included in an embodiment of this invention.
Figure 5:
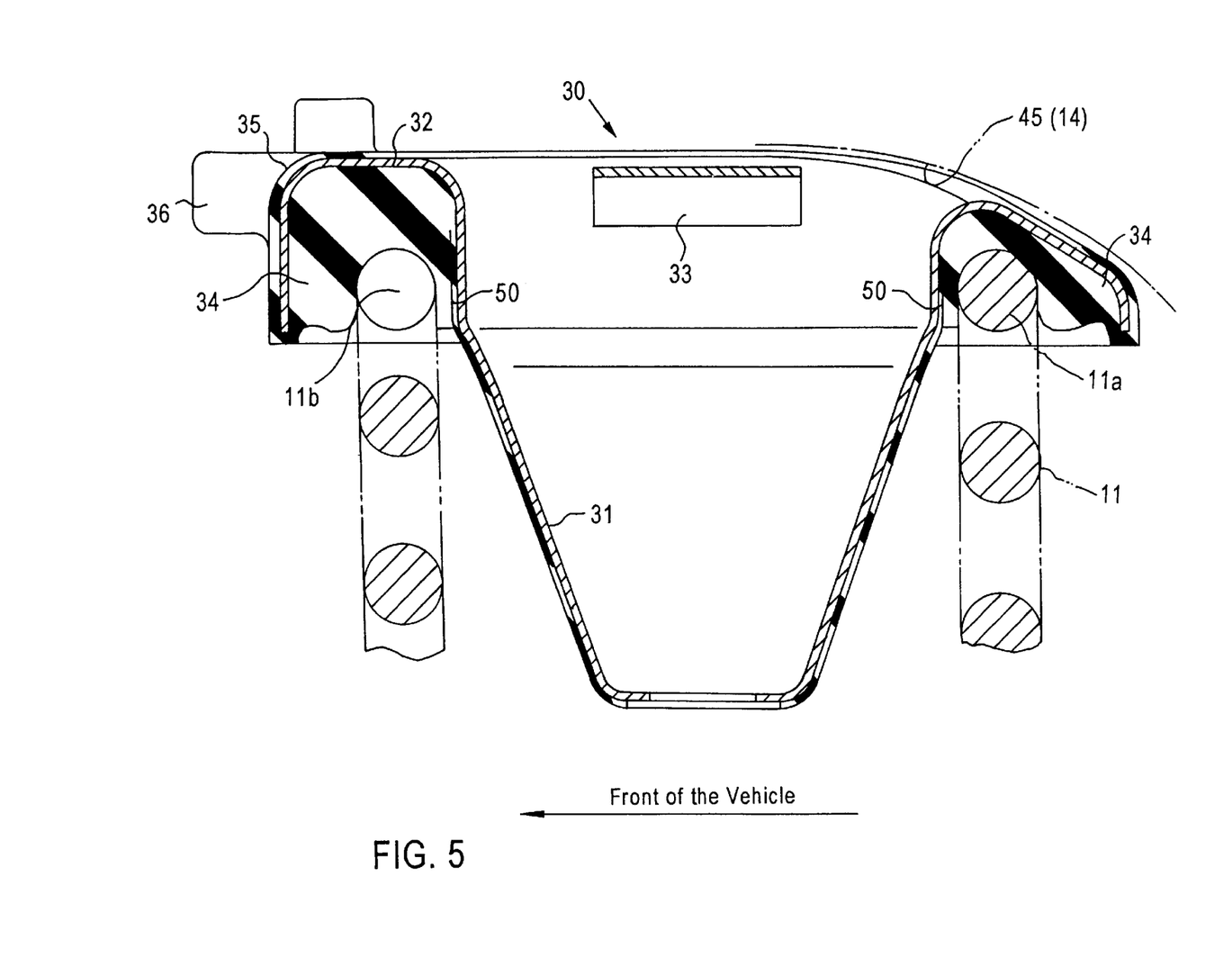
FIG. 5 is a side sectional view of a spring bracket included in an embodiment of this invention.

The spring bracket 30 in this embodiment has a structure shown in the plan view of FIG. 3, the cross-sectional rear view of FIG. 4, and the cross-sectional side view of FIG. 5.

The spring bracket 30 includes a spring guide 31 which is disposed at the center of the spring bracket 30, a spring receiving part 32 which is disposed at an outer circumference of the spring guide 31, and a bridge-like connecting member 33 which is disposed at an upper side of the spring guide 31.

The spring guide 31 comprises a conically-shaped member whose diameter reduces downwardly, and is essentially coaxially insertable into the upper end 11a of the coil spring 11.

The spring receiving member 32, which is integrally connected to an upper part of the spring guide 31, comprises a plate which is disposed about an outer circumference of the spring guide 31. A bushing 34 is bonded to a lower surface of the spring receiving member 32, and a seat rubber 35 is bonded to the upper and outer surfaces thereof.

A slit 50 is provided between a spring fitting part 34a of the bushing 34, to which the coil spring is attached, and the spring receiving part 32 at an inner circumferential side of the bushing 34. Further, a slit 51 is provided between the spring fitting part 34a and the spring receiving part 32 at an outer circumferential side of the bushing 34. These slits 50, 51, make it possible to improve the durability of the bushing 34 by relieving a load which may be applied by the coil spring 11. It is, however, not necessary to form a slit in an outer circumference of the left side of the bushing 34 shown in FIG. 4 when there is sufficient distance between the spring fitting part 34a and an end of the bushing 34 in a radial direction.

In this embodiment, a rear part of an upper surface of the spring receiving part 32 is formed as an inclined surface which is inclined toward the rear of the vehicle body as shown in FIG. 5. This coincides with an inclination of a bracket fitting surface 45 of the body component 14 which is provided to improve the trunk room space at a rear side of the vehicle.

Two "first" protrusions 36, which form the rotation preventing device, project outwardly from the spring receiving part 32 at its outer circumference, as shown in FIGS. 3 and 5. These protrusions 36 are made of rubber and it is accordingly possible to prevent noise when the protrusions 36 contact other parts of the vehicle.

As described above, the spring bracket 30 includes the bridge-like connecting member 33. In this arrangement the bridge-like connecting member 33 is made of a plate which spans across an inner circumference of an upper end of the spring guide 31, and is provided with a securing hole 33a at a center portion of the spring bracket 30, as seen in plan in FIG. 3.

Figure 6:
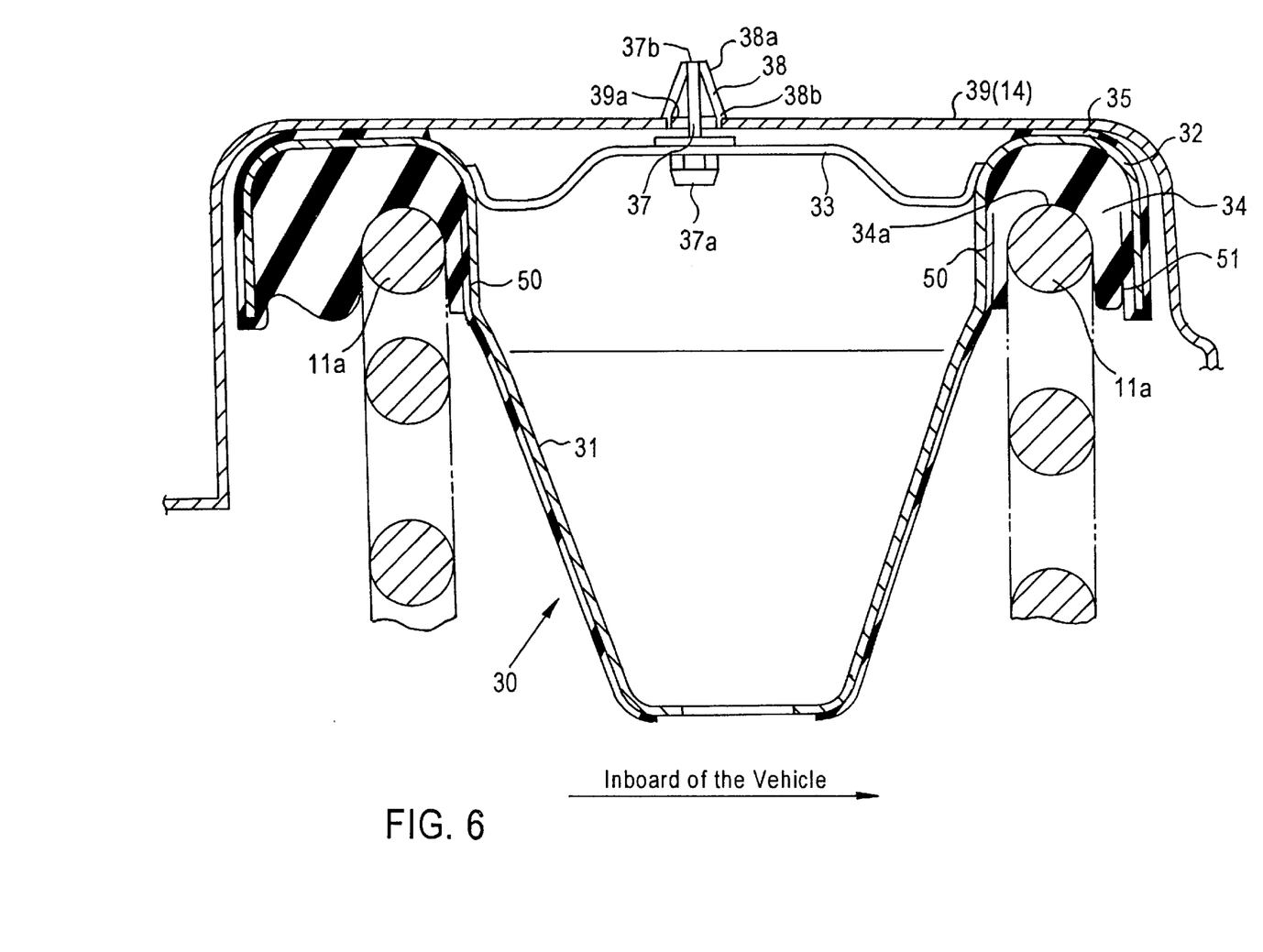
FIG. 6 is a rear sectional view showing a connection between the spring bracket and a body bracket.

A pin 37, which forms part of a connection arrangement that connects the body bracket 30 to the body component 14, is disposed in the securing hole 33a shown in FIG. 6. The pin 37 projects upwardly, namely toward the body component 14, in a manner which fixes a base part 37a of the pin 37 to the securing hole 33a, and is provided with a barbed self-locking member 38 as a disconnection preventing arrangement.

A first end 38a of the barbed self-locking member 38 is axially supported to a top part 37b of the pin 37, while the barbs 38b of the barbed self-locking member 38 are preloaded in a manner to extend out in a circumferential direction.

Reference numeral 39, shown in FIG. 6, denotes a body bracket which comprises a part of the body component 14. The body bracket 39 is a plate structure which is formed in a shape so that an inner surface of the bracket 39 is able to fit about an outer surface of the spring bracket 30. The spring bracket 30 is attached to the body bracket 39 as the body component 14 via the seat rubber 35 by fitting the spring bracket 30 into the body bracket 39 from lower side.

A fitting hole 39a is provided at a center portion of the body bracket 39 as seen in plan view. The pin 37 goes through the fitting hole 39a and is secured to the fitting hole 39a by engagement with the second end 38b of the barbed self-locking member 38 to the upper end of the body bracket 39.

Thus, the spring bracket 30 is attached to the body component 14 by the pin 37. The body bracket 39 includes a second protrusion 40, which protrudes inwardly at an inner circumferential position of the body bracket 39 and which becomes engaged between two of first protrusions 36 in the manner shown in FIG. 3. Rotational movement of the spring bracket 30 about the pin 37 with respect to the body component 14 is prevented by disposition of the second protrusion 40 between the two first protrusions 36.

The manner in which the spring bracket 30 is connected to the upper end 11a of the coil spring 11 is as follows:

The spring guide 31 is inserted coaxially into the inner circumference of the upper end 11a of the coil spring 11 from the upper side by moving the spring bracket 30 toward the coil spring 11 and in a direction which is essentially coaxially with the upper end of the spring 11.

Then, the upper end 11a of the coil spring 11 is seated against the spring fitting part 34a of the bushing 34 which is bonded to the lower surface of the spring receiving part 32, by guidance of the spring guide 31. Thus, the coil spring 11 is connected to the spring bracket 30.

In this embodiment, when the spring guide 31 is inserted into the upper end 11a of the coil spring 11, since the bushing 34 is bonded to the spring guide 31, it is able to avoid having the inner circumference of the bushing 34 becoming caught between the coil spring 11 and the spring guide 31.

The manner in which the spring bracket 30 is connected to the body component 14 is explained as follows:

The pin 37 is disposed in the securing hole 33a which is provided in the bridge-like connecting member 33 of the spring bracket 30, and is arranged to project upwardly with respect to the spring bracket 30.

Next, the spring bracket 30 is fitted to the body bracket 39 from lower side.

The position of the spring bracket 30 in circumferential direction is determined and the rotation of the spring bracket 30 is prevented by fitting the spring bracket 30 into the body bracket 39 under the condition that the position of the second protrusion 40 is received between two of first protrusions 36.

Simultaneously, the tip of the pin 37 enters into the fitting hole 39a which is provided on the body bracket 39. The barbed member 38 which is provided on the tip of the pin 37 passes through the fitting hole 39a with the barbs 38b pressed inwardly by the engagement with an inner surface of the fitting hole 39a. Since the barbed self-locking member 38 expands outwardly, and the diameter of the barbs 38b of the barbed self-locking member 38 are larger than the diameter of the fitting hole 39a, the barbed self-locking member 38 cannot be withdrawn from the body bracket 39 due to the engagement of the barbs 38b against an upper surface of the body bracket 39.

Therefore, the spring bracket 30 is connected to the body bracket 39 as the body component 14 simply by pressing the spring bracket into position from the lower side of the body bracket.

Further, in this embodiment, the spring bracket 30 is connected to the body bracket 39, as a part of the body component 14, at an inner circumferential position from the spring receiving part 32. Therefore, it is not necessary to provide a flange at the outer circumference of the spring receiving part 32 for attaching the spring bracket 30 to the body bracket 39. As a result, the space required for the upper mount structure is reduced.

Additionally, it is only necessary to provide the one body bracket 39 for fitting the spring bracket 30 and to perforate one securing hole 33a in the body component 14 for mounting the coil spring 11 to the body component. Accordingly, it is possible to simply use a mounting structure which is easy to work with, even though a part of the body component 14, which is opposed to the spring bracket 30, has an inclined surface, and to further reduce the space occupied by mounting the upper end 11a of the coil spring 11.

The function and effect which relate to act of the suspension system as to structure for mounting the suspension spring is as follows:

In this embodiment, since the spring bracket 30 is constantly pressed against the body bracket 39 by the coil spring 11, the spring bracket 30 is secured to the body bracket 39 even when the wheel 1 undergoes a full rebound.

In the above structure, since the spring bracket 30 is connected to the body bracket 39 under a condition that the spring bracket 30 can be permitted some movement in the vertical direction and the like due to the use of a single pin 37, the problem that noise will be generated by metal-to-metal contact between the spring bracket 30 and the body bracket 39, is prevented since the rubber seat 35 is attached between the spring bracket 30 and the body bracket 39. This prevents the generation of noise by avoidance of metal contact even with the above type of structure.

In general, since the wheel 1 can move with respect to the vehicle body in a longitudinal direction corresponding to the bounding and rebounding wheel 1, the lower-portion of the coil spring 11 is offset to the side, and a partially concentrated load effects the spring bracket 30 when the coil spring 11 strokes in the vertical direction.

However, a force which tends to make the spring bracket 30 move laterally with respect to the vehicle body, and which is applied between the spring bracket 30 and body bracket 39, is negated by the large amount of friction which is generated between the rubber seat 35 and body bracket 39 which is made of metal plate. This induces the spring bracket 30 and the body bracket 39 to rub against each other.

If the spring bracket 30 tends to move laterally with respect to the body bracket 39 under the influence of a high partially concentrated load in spite of the friction between the rubber seat 35 and body bracket 39, the lateral movement of the spring bracket 30 is prevented by contact between the spring bracket 30 and the inner surface of the body bracket 39. In such case, it is possible to prevent noise being generated between the spring bracket 30 and the body bracket 39 due to the provision of the rubber seat 35.

If a moment which makes the spring bracket 30 rotate around the pin 37 tends to be generated by the partially concentrated load, however, this rotational movement of the spring bracket 30 is limited by contact between one of first protrusions 36 and the second protrusion 40. Moreover, it is possible to prevent noise being generated by contact between the protrusions 36 and the protrusion 40 because the protrusions 36 are made by rubber.

In the above mentioned structure, it is further possible to prevent the deterioration and loss of durability of the bushing 34 due to an inclined surface of the body component 14 which is provided to improve the trunk room space at a rear side of the vehicle, and the concentrated application of load to the bushing 34 which tends to result when the spring bracket 30 is attached to the inclined surface of the body component 14 and spring bracket 30 tends to rotate.

Although the invention has been described with respect to the embodiment wherein the projection part which connects the spring bracket 30 to the body bracket 39 of the body component 14 is formed by the pin 37, this invention can be applied to the situation wherein a bolt is used for the projection part and a nut replaces the barbed self-locking member 38.

Although the invention has been described with respect to the embodiment which has one connection between the spring bracket 30 and the body component 14 by the projection part, this invention can be applied to two or more projection parts for two or more connections.

Although the invention has been described with respect to the embodiment that the disconnection preventing device which prevents said projection part disconnecting from the hole is provided with the barbed self-locking member 38 which is connected to the tip of the pin 37, the disconnection preventing device is not limited to this type of arrangement. For example, it can be replaced with a lateral bore which is formed at the tip of the pin 37 in combination with a snap pin which is inserted into to the bore.

Although the invention has been described with respect to the embodiment that the rubber seat 35 is connected to the upper surface of the spring bracket 30, this invention can be applied so that the rubber part 35 is connected to the inner surface of the body bracket 39.

What is claimed is:

1. A structure for mounting a coil spring of a suspension system to a vehicle body comprising:

a spring bracket;

a coil spring having an upper end disposed against said spring bracket, a connection device which connects said spring bracket to the vehicle body and which is disposed at an essentially central portion of said spring bracket, said connecting device comprising:

a projection part which is provided on said spring bracket, said projection part projecting through a hole formed in the vehicle body to connect the spring bracket to the vehicle body, said connection device having a disconnection preventing device which prevents the projection part returning through the hole, said disconnection preventing device comprising:

a barbed member which is formed at a tip of the projection part and is biased laterally outward and which prevents disconnection via laterally outward movement of the barb.

2. A structure for mounting a coil spring of a suspension system to a vehicle body as claimed in claim 1, wherein outer surfaces of said barbed member expand in a direction from the tip of the projection part toward the spring bracket, and a diameter of the tip of the projection part is smaller than a diameter of the hole.

3. A structure for mounting a coil spring of a suspension system to a vehicle body as claimed in claim 1, wherein the mounting structure further comprising an elastic member disposed between said spring bracket and the vehicle body.

4. A structure for mounting a coil spring of a suspension system to a vehicle body as claimed in claim 1, wherein a bushing is connected to a spring receiving part of said spring bracket.

5. A structure for mounting a coil spring of a suspension system to a vehicle body as claimed in claim 1, wherein the mounting structure further comprises a body bracket which is connected to the vehicle body and adapted to receive the spring bracket, said body bracket having the hole through which the barbed member is disposed, formed therein.

6. A structure for mounting a coil spring of a suspension system to a vehicle body as claimed in claim 1, further comprising a rotation preventing device which prevents said spring bracket from rotating with respect to the vehicle body.

7. A structure for mounting a coil spring of a suspension system to a vehicle body as claimed in claim 6, wherein said rotation preventing device of the mounting structure comprises engaging parts which are respectively formed on the spring bracket and the vehicle body, and which engage one another.

8. A structure for mounting a coil spring of a suspension system to a vehicle body as claimed in claim 1, further comprising a shock absorber which extends downwardly from the vehicle body, said shock absorber being disposed externally of the coil spring.

9. A structure for mounting a coil spring of a suspension system to a vehicle body comprising:

a spring bracket;

a coil spring having an upper end disposed against said spring bracket, a connection device which connects said spring bracket to the vehicle body and which is disposed at an essentially central portion of said spring bracket, and a bushing is connected to a spring receiving part of said spring bracket, said bushing including a slit which extends about a portion of a loop of the coil spring.

10. A structure for mounting a coil spring of a suspension system to a vehicle body comprising:

a spring bracket having a ring-shaped receiving part, said spring receiving part receiving an upper end of a coil spring which forms part of the suspension system;

a connector including a projection part which is provided at the center of said spring bracket and projects through said vehicle body, and a barbed member which is formed at a tip of the projection part and is biased laterally outward, said barbed member preventing disconnection of the projection part from the vehicle body via the laterally outward movement of the barbed member.

11. A structure for mounting a coil spring of a suspension system to a vehicle body as claimed in claim 10, wherein the mounting structure further comprises an elastic member disposed between said vehicle body and said spring bracket.

12. A structure for mounting a coil spring of a suspension system to a vehicle body as claimed in claim 10, further comprising a bushing disposed on said spring bracket in a manner to receive an upper coil of the spring.

13. A structure for mounting a coil spring of a suspension system to a vehicle body as claimed in claim 10, wherein said bushing includes a slit which is extends about portion of a loop of the coil spring.

14. A structure for mounting a coil spring of a suspension system to a vehicle body as claimed in claim 10, wherein the mounting structure further comprises a body bracket which is adapted to receive the spring bracket.

15. A structure for mounting a coil spring of a suspension system to a vehicle body as claimed in claim 10, further comprising a rotation preventing device which prevents said spring bracket from rotating with respect to the vehicle body.

16. A structure for mounting a coil spring of a suspension system to a vehicle body as claimed in claim 15, wherein said rotation preventing device includes two spaced first protrusions which are provided at an outer circumference of said spring receiving part and a second protrusion which is provided on said vehicle body and which is disposed between the two space first protrusions in a manner to prevent rotation of said spring bracket with respect to the vehicle body.

* * * * *